US008911581B2

(12) United States Patent
Chiu et al.

(10) Patent No.: US 8,911,581 B2
(45) Date of Patent: Dec. 16, 2014

(54) COMPOSITE LIGHT GUIDE PLATE MANUFACTURING METHOD

(71) Applicant: Compal Electronics, Inc., Taipei (TW)

(72) Inventors: Ju-Chen Chiu, Taipei (TW); Chien-Min Chang, Taipei (TW); Po-An Lin, Taipei (TW); Chih-Hua Liu, Taipei (TW); Hao-Ying Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 51 days.

(21) Appl. No.: 13/914,646

(22) Filed: Jun. 11, 2013

(65) Prior Publication Data

US 2014/0116607 A1    May 1, 2014

Related U.S. Application Data

(60) Provisional application No. 61/720,995, filed on Oct. 31, 2012.

(51) Int. Cl.

| | |
|---|---|
| *B44C 1/17* | (2006.01) |
| *B29C 65/52* | (2006.01) |
| *B32B 37/26* | (2006.01) |
| *B32B 38/10* | (2006.01) |
| *B32B 38/14* | (2006.01) |
| *B32B 43/00* | (2006.01) |
| *F21V 8/00* | (2006.01) |

(52) U.S. Cl.
CPC .................................. *G02B 6/0001* (2013.01)
USPC ........... 156/237; 156/239; 156/240; 156/241; 156/277; 156/289

(58) Field of Classification Search
CPC .. B44C 1/1712; B44C 1/1716; B44C 1/1756; B05D 5/06; B32B 7/06; B32B 7/12; B32B 27/00; B32B 37/025; B32B 37/12; B32B 37/26; B32B 38/10; B32B 38/14; H01L 21/67132; H01L 21/6835; B41M 3/12; B41M 5/0256; B29C 65/02; B29C 65/18; B29C 65/48; G02B 6/0001; G02B 6/0021; G02B 6/0031; G02B 6/0036; G02B 6/0038; G02B 6/0043; G02B 6/0055; G02B 6/0061; G02B 6/0065; G02F 1/133605; G02F 1/133604; G02F 1/133615
USPC ................. 156/237–241, 247, 249, 277, 289; 249/65, 67; 362/609, 612, 623, 624, 362/625, 627–629
See application file for complete search history.

(56) References Cited

U.S. PATENT DOCUMENTS 5,698,299 A * 12/1997 Schmidt et al. ............... 428/209
6,447,135 B1 * 9/2002 Wortman et al. ............. 362/623

(Continued)

FOREIGN PATENT DOCUMENTS

| JP | 07161216 A | * | 6/1995 |
| TW | 201224541 A1 | | 6/2012 |
| WO | WO 03086959 A2 | * | 10/2003 |

OTHER PUBLICATIONS

English Abstract of JP 07-161216 (Sep. 27, 2014).*

*Primary Examiner* — Sing P Chan
(74) *Attorney, Agent, or Firm* — CKC & Partners Co., Ltd.

(57) ABSTRACT

A composite light guide plate manufacturing method includes the steps of providing a light guide substrate; providing a transfer membrane, which sequentially includes a substrate, a reflective layer and a diffusion microstructure; attaching the transfer membrane to the light guide substrate with a side of the transfer membrane, which has the diffusion microstructure thereon; and removing the substrate to expose the reflective layer.

9 Claims, 7 Drawing Sheets

(56) References Cited

U.S. PATENT DOCUMENTS

| | | | |
|---|---|---|---|
| 6,521,324 B1* | 2/2003 | Debe et al. | 156/235 |
| 6,687,200 B1* | 2/2004 | Kobayashi | 369/44.26 |
| 6,887,650 B2* | 5/2005 | Shimoda et al. | 430/311 |
| 6,929,377 B2* | 8/2005 | Hirose | 362/629 |
| 7,045,558 B2* | 5/2006 | Chisholm et al. | 522/182 |
| 7,251,077 B2* | 7/2007 | Holmes et al. | 359/599 |
| 7,262,899 B2* | 8/2007 | Bigman | 359/269 |
| 7,270,929 B2* | 9/2007 | Kwasny et al. | 430/138 |
| 7,278,772 B2* | 10/2007 | Kunimochi | 362/619 |
| 7,281,810 B2* | 10/2007 | Lee | 359/850 |
| 7,446,915 B2* | 11/2008 | Holmes et al. | 359/15 |
| 7,491,422 B2* | 2/2009 | Zhang et al. | 427/256 |
| 7,507,012 B2* | 3/2009 | Aylward et al. | 362/625 |
| 7,531,120 B2* | 5/2009 | Van Rijn et al. | 264/299 |
| 7,625,515 B2* | 12/2009 | Lee et al. | 264/496 |
| 7,824,092 B2* | 11/2010 | Yang et al. | 362/623 |
| 7,834,962 B2* | 11/2010 | Satake et al. | 349/110 |
| 7,914,174 B2* | 3/2011 | Ho et al. | 362/257 |
| 7,942,556 B2* | 5/2011 | Harbers et al. | 362/294 |
| 7,972,875 B2* | 7/2011 | Rogers et al. | 438/21 |
| 8,027,086 B2* | 9/2011 | Guo et al. | 359/485.05 |
| 8,192,637 B2* | 6/2012 | Washiya et al. | 216/22 |
| 8,264,622 B2* | 9/2012 | Gourlay | 349/3 |
| 8,377,540 B2* | 2/2013 | Chiu et al. | 428/161 |
| 8,487,518 B2* | 7/2013 | Johnston et al. | 313/46 |
| 8,632,237 B2* | 1/2014 | Chiang et al. | 362/615 |
| 8,721,824 B2* | 5/2014 | Chang et al. | 156/219 |
| 8,834,001 B2* | 9/2014 | Lin et al. | 362/612 |
| 2001/0022636 A1* | 9/2001 | Yang et al. | 349/65 |
| 2003/0022403 A1* | 1/2003 | Shimoda et al. | 438/14 |
| 2003/0067565 A1* | 4/2003 | Yamamura | 349/65 |
| 2004/0028875 A1* | 2/2004 | Van Rijn et al. | 428/98 |
| 2004/0136038 A1* | 7/2004 | Holmes et al. | 359/15 |
| 2004/0190102 A1* | 9/2004 | Mullen et al. | 359/237 |
| 2005/0002172 A1* | 1/2005 | Han et al. | 362/31 |
| 2005/0030630 A1* | 2/2005 | Ohnishi et al. | 359/599 |
| 2005/0052745 A1* | 3/2005 | Lee | 359/567 |
| 2005/0106839 A1* | 5/2005 | Shimoda et al. | 438/458 |
| 2005/0110174 A1* | 5/2005 | Chen | 264/1.34 |
| 2005/0255237 A1* | 11/2005 | Zhang et al. | 427/180 |
| 2006/0188828 A1* | 8/2006 | Kwasny et al. | 430/330 |
| 2006/0256415 A1* | 11/2006 | Holmes et al. | 359/28 |
| 2007/0115686 A1* | 5/2007 | Tyberghien | 362/580 |
| 2007/0289119 A1* | 12/2007 | Lee et al. | 29/592.1 |
| 2008/0037124 A1* | 2/2008 | Ohmi et al. | 359/558 |
| 2008/0080055 A1* | 4/2008 | Lightfoot et al. | 359/599 |
| 2008/0084709 A1* | 4/2008 | Li et al. | 362/616 |
| 2008/0123366 A1* | 5/2008 | Yang et al. | 362/625 |
| 2008/0180956 A1* | 7/2008 | Gruhlke et al. | 362/331 |
| 2008/0227036 A1* | 9/2008 | Matsushita et al. | 430/322 |
| 2008/0304287 A1* | 12/2008 | Chiang et al. | 362/618 |
| 2009/0046362 A1* | 2/2009 | Guo et al. | 359/486 |
| 2009/0097273 A1* | 4/2009 | Chang | 362/618 |
| 2009/0161048 A1* | 6/2009 | Satake et al. | 349/110 |
| 2009/0213464 A1* | 8/2009 | Kurachi et al. | 359/599 |
| 2009/0243126 A1* | 10/2009 | Washiya et al. | 264/2.5 |
| 2010/0104807 A1* | 4/2010 | Chiu et al. | 428/142 |
| 2010/0118407 A1* | 5/2010 | Huff | 359/584 |
| 2010/0296025 A1* | 11/2010 | Gourlay | 349/62 |
| 2011/0064915 A1* | 3/2011 | Chang et al. | 428/172 |
| 2011/0141765 A1* | 6/2011 | Chang et al. | 362/606 |
| 2011/0188264 A1* | 8/2011 | Lin | 362/607 |
| 2012/0038140 A1* | 2/2012 | Dhome et al. | 283/67 |
| 2012/0043679 A1* | 2/2012 | Chen et al. | 264/1.38 |
| 2012/0070639 A1* | 3/2012 | Chuang et al. | 428/209 |
| 2012/0139403 A1* | 6/2012 | Johnston et al. | 313/46 |
| 2012/0194054 A1* | 8/2012 | Johnston et al. | 313/46 |
| 2012/0286436 A1* | 11/2012 | Chen et al. | 264/1.24 |
| 2013/0027975 A1* | 1/2013 | Chiang et al. | 362/611 |
| 2013/0063826 A1* | 3/2013 | Hoffmuller et al. | 359/619 |
| 2013/0155722 A1* | 6/2013 | Lin et al. | 362/612 |
| 2014/0110371 A1* | 4/2014 | Maki et al. | 216/9 |
| 2014/0185304 A1* | 7/2014 | Hsiao et al. | 362/330 |
| 2014/0248458 A1* | 9/2014 | Sherman et al. | 428/41.8 |

\* cited by examiner

COMPOSITE LIGHT GUIDE PLATE MANUFACTURING METHOD

RELATED APPLICATIONS

The present application is based on, and claims priority from, U.S. Provisional Application Ser. No. 61/720,995, filed on Oct. 31, 2012, the disclosure of which is hereby incorporated by reference herein in its entirety.

BACKGROUND

1. Field of Invention

The present invention relates to a composite light guide plate manufacturing method.

2. Description of Related Art

Figure 1:
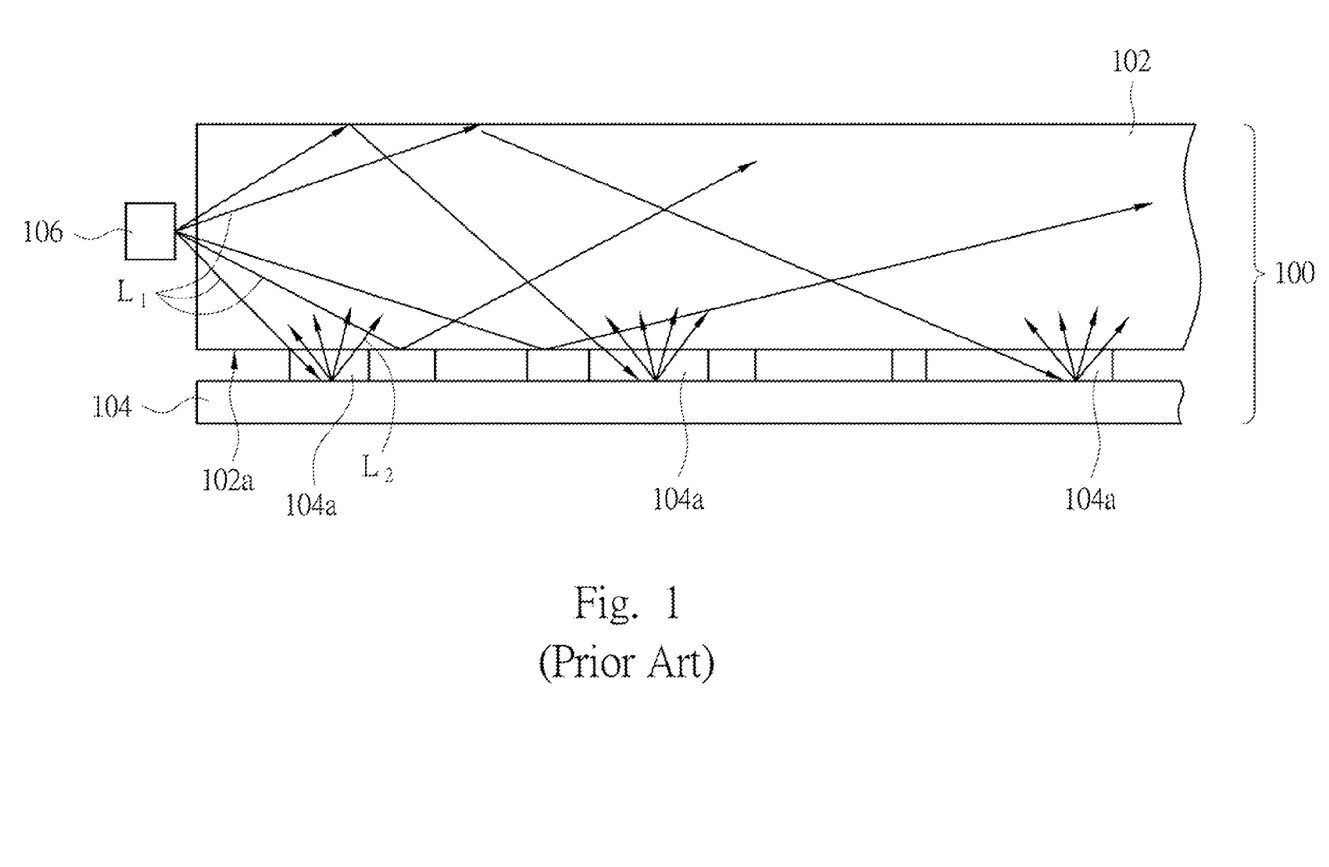
FIG. 1 illustrates an enlarged cross-sectional view of a conventional backlight module.

The Taiwan patent application (No. TW201224541) discloses a conventional backlight module. Referring to FIG. 1, it illustrates an enlarged cross-sectional view of a conventional backlight module. The backlight module includes a light guide module 100 and a light source 106. The light guide module 100 includes a light guide plate 102 and a diffusion reflection sheet 104. The light source 106 is located on a lateral edge of the light guide plate 102 to provide incident light beams L1 into the light guide plate 102. The diffusion reflection sheet 104 is fixed to the bottom surface 102a of the light guide plate 102 by means of adhesive layers 104a. The adhesive layers 104a may contain diffusion particles, mixed therein, so that the light beams L1 can generate diffusion and reflection by means of the diffusion particles, thereby enabling the light guide plate 102 to output light beams uniformly.

However, the current portable electronic products are all designed with thin profiles, such that the conventional light guide module encountered the difficulties on the reduction of the thickness when thin-profile electronic products are manufactured.

SUMMARY

It is therefore an objective of the present invention to provide a composite light guide plate manufacturing method in order to reduce an overall thickness of a backlight module.

In accordance with the foregoing and other objectives of the present invention, a composite light guide plate manufacturing method includes the steps of providing a light guide substrate; providing a transfer membrane, which includes sequentially includes a substrate, a reflective layer and a diffusion microstructure; attaching the transfer membrane to the light guide substrate with a side of the transfer membrane, which has the diffusion microstructure; and removing the substrate to expose the reflective layer.

According to another embodiment disclosed herein, the method further includes the step of forming a light diffusion layer located on a surface of the light guide substrate, which is opposite to the reflective layer.

According to another embodiment disclosed herein, the light diffusion layer is formed by coating or imprinting.

According to another embodiment disclosed herein, the reflective layer is formed by printing a white ink layer or a metallic ink layer on the substrate.

According to another embodiment disclosed herein, the reflective layer is a metal coating formed by electroless plating, electroplating, sputtering or vapor deposition.

According to another embodiment disclosed herein, the method further includes the step of forming a releasing layer between the substrate and the reflective layer to easily separate the substrate apart from the reflective layer.

According to another embodiment disclosed herein, the method further includes the step of forming an adhesive layer on the diffusion microstructure.

According to another embodiment disclosed herein, the substrate is a plastic membrane, a metallic membrane or a paper membrane.

According to another embodiment disclosed herein, the diffusion microstructure is an opaque white ink layer.

Thus, the composite light guide plate manufacturing method has at least the following advantages:

(1) The thickness of the reflective layer can be made thinner (compared with the conventional reflection sheet) by a transfer method instead, thereby reducing the overall thickness of the composite light guide plate;

2) The light diffusion layer on the emitting surface of the light guide plate can be formed by directly coating or imprinting manner, and its thickness is also thinner than a conventional independent diffusion sheet, thereby reducing the overall thickness of the composite light guide plate as well; and (3) The downsizing of the reflective layer and the diffusion layer can also decrease the materials of the reflective layer and the diffusion layer, thereby saving the material costs.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2A:
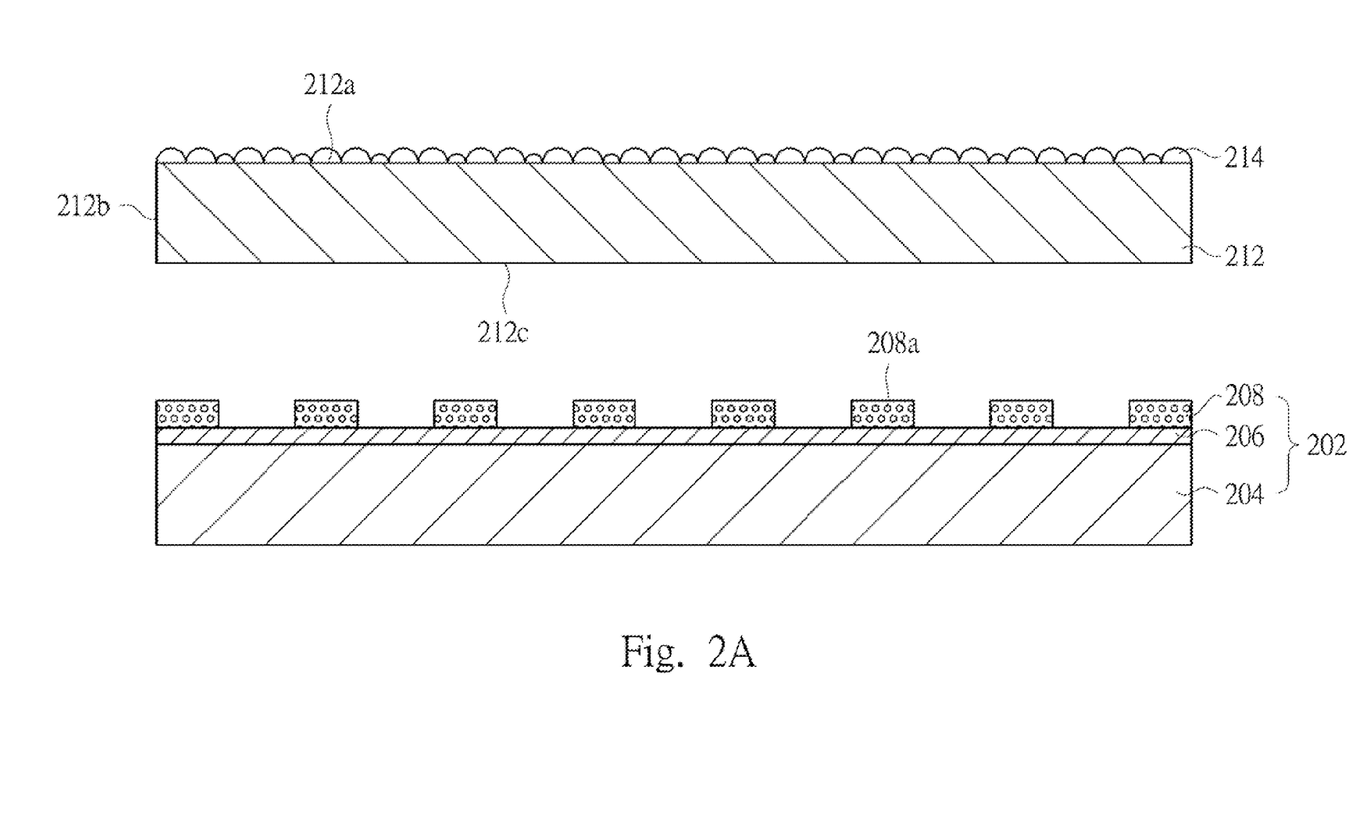
FIGS. 2A-2C sequentially illustrate cross-sectional views of a composite light guide plate manufacturing method according to an embodiment of this invention.
Figure 2B:
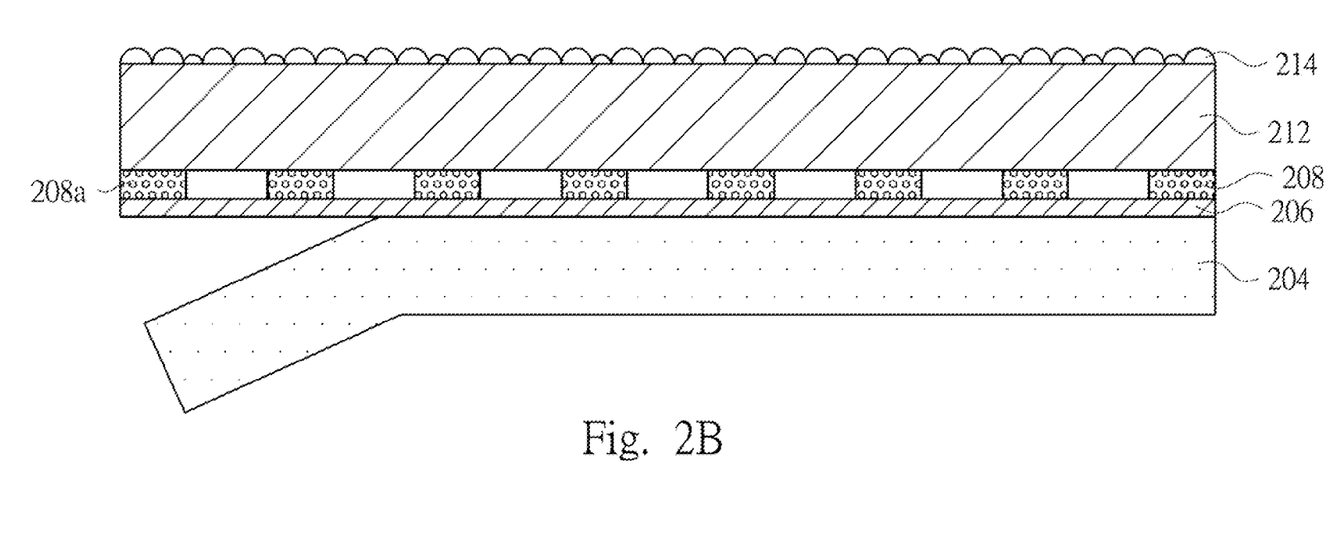
Figure 2C:
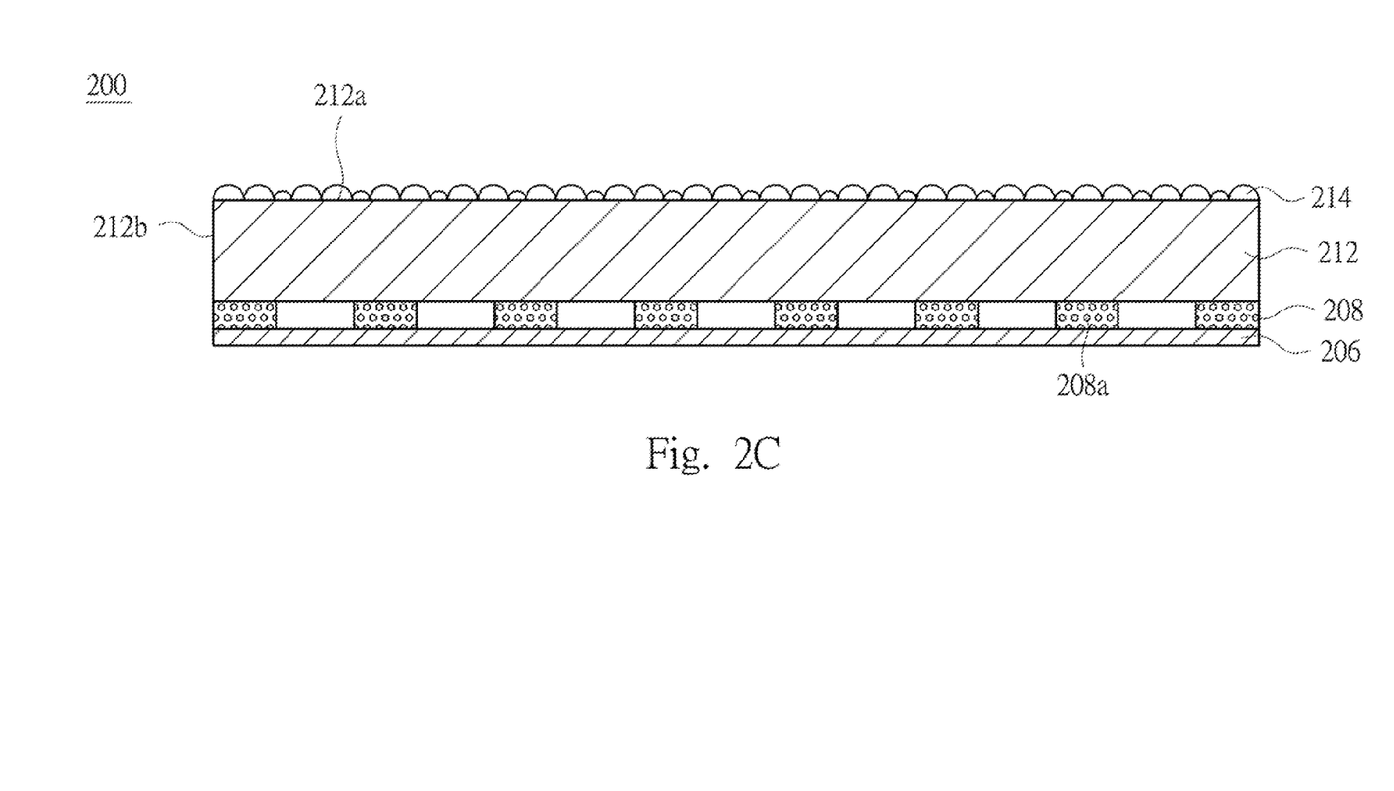

The present invention provides a composite light guide plate manufacturing method to manufacture a light guide plate within a backlight module of a thin-profile portable electronic product. FIGS. 2A-2C sequentially illustrate cross-sectional views of a composite light guide plate manufacturing method according to an embodiment of this invention. A light guide substrate 212 is provided with a light diffusion layer 214, but not being limited to, formed on a light-emitting surface 212a of the light guide substrate 212. A transfer membrane 202 is provided to sequentially include a substrate 204, a reflective layer 206 and multiple diffusion microstructures 208. The transfer membrane 202 is used to "transfer" the reflective layer 206 and multiple diffusion microstructures 208 to the light guide substrate 212 so as to achieve a thin-profile composite light guide plate. Referring to FIG. 2B, the transfer membrane 202 is attached to the light guide substrate 212 with its side, which has the diffusion microstructure 208, e.g. by heating or pressing the transfer membrane 202 to the light guide substrate 212. In particular, the transfer membrane 202 is attached to a surface 212c of the light guide substrate 212 to which the light-emitting surface 212a is opposite. The substrate 204 is then removed to expose the reflective layer 206 (as illustrated in FIG. 2B) so as to achieve a composite light guide plate 200 (as illustrated in FIG. 2C). In this embodiment, the light diffusion layer 214 is located on a surface (i.e., the light-emitting surface 212a) of the light guide substrate 212, which is opposite to the reflective layer 206.

The light diffusion layer 214 can be formed by, but not being limited to, coating or imprinting (e.g., heat imprinting). The substrate 204 of the transfer membrane 202 can be a plastic membrane, a metallic membrane, a paper membrane or other applicable membranes. In an embodiment, the reflective layer 206 of the transfer membrane 202 is formed by, but not being limited to, printing a white ink layer or a metallic ink layer on the substrate 204. In another embodiment, the reflective layer 206 of the transfer membrane 202 can be a metal coating formed by, but not being limited to, electroless plating, electroplating, sputtering or vapor deposition. No matter how the reflective layer 206 is made, e.g., electroless plating, electroplating, sputtering or vapor deposition, the reflective layer 206 can be made thinner (compared with the conventional reflective layer) because the reflective layer 206 is coated on the substrate 204, which serves as a support base. When the reflective layer 206 of the transfer membrane 202 is "transferred" to the light guide substrate 212 to form a composite light guide plate 200, its overall thickness is a little bit thicker than the light guide substrate 212, thereby maintain the composite light guide plate 200 as a thin profile. In addition, the diffusion microstructures 208 are opaque white ink layers on the reflective layer 206. In this embodiment, the diffusion microstructures 208 may contain, but not being limited to, diffusion particles 208a mixed therein.

Referring to FIG. 2C, it illustrates a finished composite light guide plate. When the composite light guide plate 200 serves as part of the back-light module of the portable electronic device, the light beams are input through the light-receiving surface 212b of the light guide substrate 212, and then reflected by the reflective layer 206 or the diffusion microstructures 208, and finally output through the light-emitting surface 212a of the light guide substrate 212 (it without the light diffusion layer 214), or finally output through the light diffusion layer 214 uniformly.

Figure 3A:
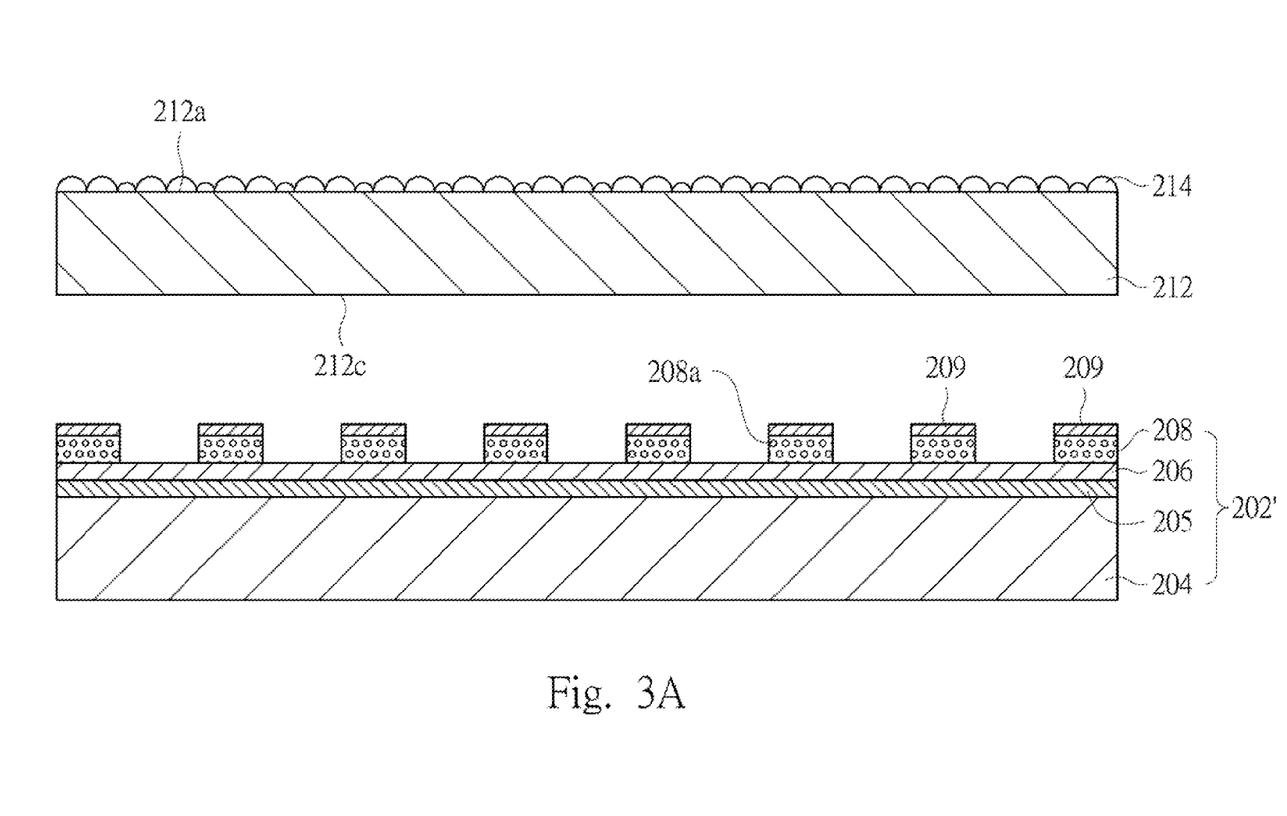
FIGS. 3A-3C sequentially illustrate cross-sectional views of a composite light guide plate manufacturing method according to another embodiment of this invention.
Figure 3B:
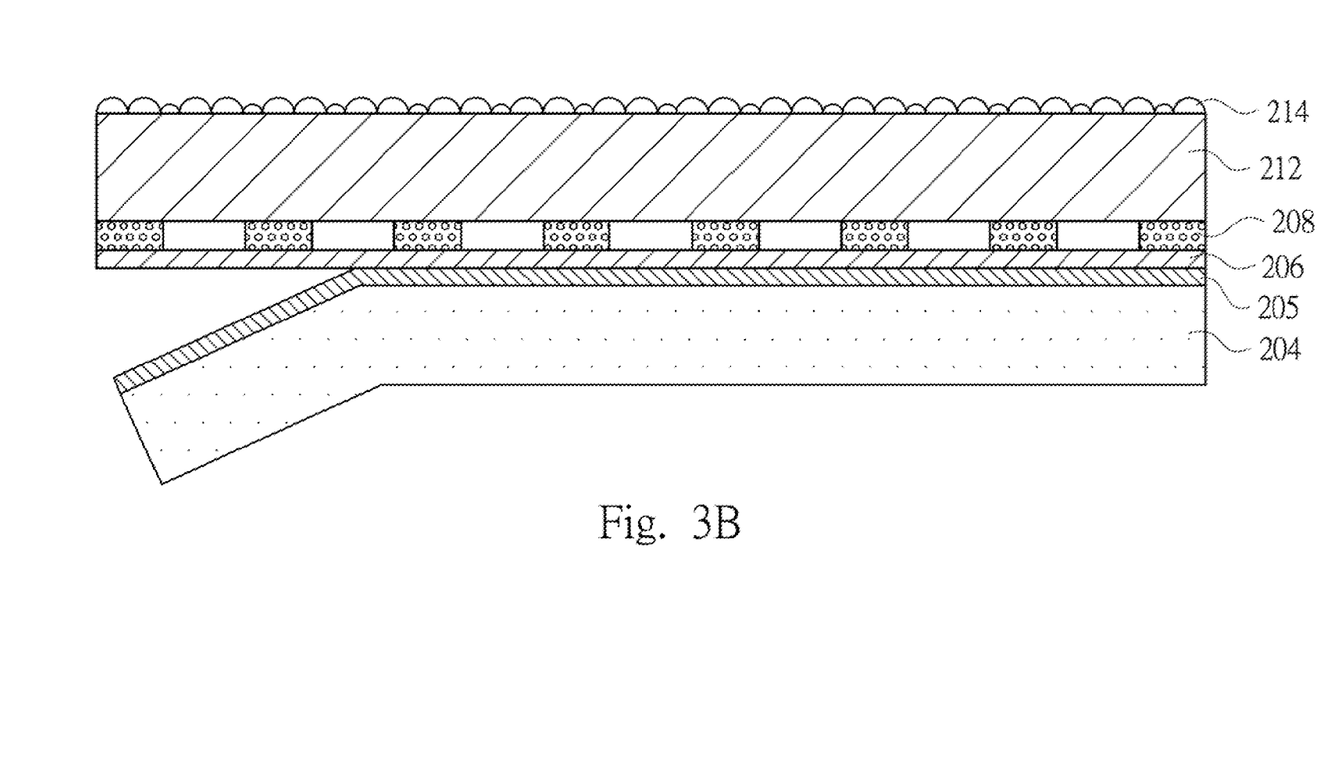
Figure 3C:
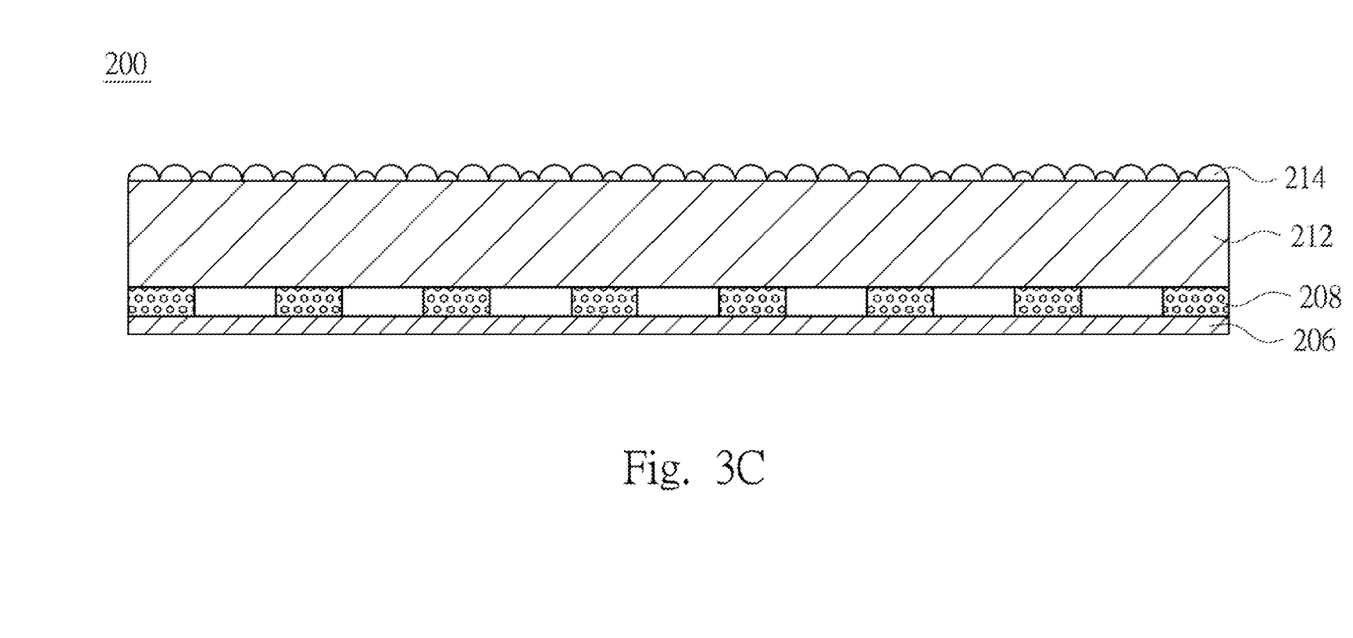

FIGS. 3A-3C sequentially illustrate cross-sectional views of a composite light guide plate manufacturing method according to another embodiment of this invention. The embodiment of FIGS. 3A-3C is different from the embodiment of FIGS. 2A-2C in a different transfer membrane.

A light guide substrate 212 is provided with a light diffusion layer 414, but not being limited to, formed on a light-emitting surface 212a of the light guide substrate 212. A transfer membrane 202' is provided to sequentially include a substrate 204, a releasing layer 205, a reflective layer 206 and multiple diffusion microstructures 208. The transfer membrane 202' is used to "transfer" the reflective layer, the reflective layer and multiple diffusion microstructures 208 to the light guide substrate 212 so as to achieve a thin-profile composite light guide plate. Referring to FIG. 3B, the transfer membrane 202' is attached to the light guide substrate 212 with its side, which has the diffusion microstructure 208, e.g. by heating or pressing the transfer membrane 202' to the light guide substrate. In particular, the transfer membrane 202' is attached to a surface 212c of the light guide substrate 212 to which the light-emitting surface 212a is opposite. The substrate 204 is then removed to expose the reflective layer 206 (as illustrated in FIG. 3B) so as to achieve a composite light guide plate 200 (as illustrated in FIG. 3C). In this embodiment, the light diffusion layer 214 is located on a surface (i.e., the light-emitting surface 212a) of the light guide substrate 212, which is opposite to the reflective layer 206.

In this embodiment, a releasing layer 205 is added between the substrate 204 and the reflective layer 206 of the transfer membrane 202' so as to easily separate substrate 204 apart from the reflective layer 206 and not to damage the reflective layer 206.

Moreover, adhesive layers 209 may be further formed on those diffusion microstructures 208 before the transfer membrane 202' is attached to the light guide substrate 212. Therefore, after the transfer membrane 202' is attached to the light guide substrate 212, the diffusion microstructures 208 can be reliably attached to the light guide substrate 212.

The light diffusion layer 214 can be formed by, but not being limited to, coating or imprinting (e.g., heat imprinting). The substrate 204 of the transfer membrane 202' can be a plastic membrane, a metallic membrane, a paper membrane or other applicable membranes. In an embodiment, the reflective layer 206 of the transfer membrane 202' is formed by, but not being limited to printing a white ink layer or a metallic ink layer on the substrate 204. In another embodiment, the reflective layer 206 of the transfer membrane 202' can be a metal coating formed by, but not being limited to, electroless plating, electroplating, sputtering or vapor deposition. No matter how the reflective layer 206 is made, e.g., electroless plating, electroplating, sputtering or vapor deposition, the reflective layer 206 can be made thinner (compared with the conventional reflective layer) because the reflective layer 206 is coated on the substrate 204, which serves as a support base. When the reflective layer 206 of the transfer membrane 202' is "transferred" to the light guide substrate 212 to form a composite light guide plate 200, its combination thickness is a little bit thicker than the light guide substrate 212, thereby maintaining the composite light guide plate 200 as a thin profile. In addition the diffusion microstructures 208 are opaque white ink layers of the reflective layer 206. In this embodiment, the diffusion microstructure 208 may contain, but not being limited to, diffusion particles 208a mixed therein.

Referring to FIG. 3C, it illustrates a finished composite light guide plate. When the composite light guide plate 200 serves as part of the back-light module of the portable electronic device, the light beams are input through the light-receiving surface 212b of the light guide substrate 212, and then reflected by the reflective layer 206 or the diffusion microstructures 208, and finally output through the light-emitting surface 212a of the light guide substrate 212 (if without the light diffusion layer 214), or finally output through the light diffusion layer 214 uniformly.

According to the above-discussed embodiments of the present invention, the composite light guide plate manufacturing method has at least the following advantages:

(1) The thickness of the reflective layer can be made thinner (compared with the conventional reflection sheet) by a transfer method instead, thereby reducing the overall thickness of the composite light guide plate;

(2) The light diffusion layer on the emitting surface of the light guide plate can be formed by directly coating or imprinting manner, and its thickness is also thinner than a conventional independent diffusion sheet, thereby reducing the overall thickness of the composite light guide plate as well; and (3) The downsizing of the reflective layer and the diffusion layer can also decrease the materials of the reflective layer and the diffusion layer, thereby saving the material costs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A composite light guide plate manufacturing method comprising:
   providing a light guide substrate;
   providing a transfer membrane, which sequentially includes a substrate, a reflective layer and a diffusion microstructure;
   attaching the transfer membrane to the light guide substrate with a side of the transfer membrane, which has the diffusion microstructure thereon; and
   removing the substrate to expose the reflective layer.

2. The method of claim 1 further comprising forming a light diffusion layer on a surface of the light guide substrate, which is opposite to the reflective layer.

3. The method of claim 2, wherein the light diffusion layer is formed by coating or imprinting.

4. The method of claim 1, wherein the reflective layer is formed by printing a white ink layer or a metallic ink layer on the substrate.

5. The method of claim 1, wherein the reflective layer is a metal coating formed by electroless plating, electroplating, sputtering or vapor deposition.

6. The method of claim 1 further comprising forming a releasing layer between the substrate and the reflective layer to easily separate the substrate apart from the reflective layer.

7. The method of claim 1 further comprising forming an adhesive layer on the diffusion microstructure.

8. The method of claim 1, wherein the substrate is a plastic membrane, a metallic membrane or a paper membrane.

9. The method of claim 1, wherein the diffusion microstructure is an opaque white ink layer.

* * * * *